US011153092B2

(12) United States Patent
Staples et al.

(10) Patent No.: US 11,153,092 B2
(45) Date of Patent: Oct. 19, 2021

(54) DYNAMIC ACCESS CONTROL ON BLOCKCHAIN

(71) Applicant: Commonwealth Scientific and Industrial Research Organisation, Acton (AU)

(72) Inventors: Mark Staples, Acton (AU); Paul Rimba, Acton (AU)

(73) Assignee: Commonwealth Scientific and Industrial Research Organisation, Acton (AU)

(*) Notice: Subject to any disclaimer, the term of this patent is extended or adjusted under 35 U.S.C. 154(b) by 212 days.

(21) Appl. No.: 16/328,159

(22) PCT Filed: Aug. 30, 2017

(86) PCT No.: PCT/AU2017/050928
§ 371 (c)(1),
(2) Date: Feb. 25, 2019

(87) PCT Pub. No.: WO2018/039722
PCT Pub. Date: Mar. 8, 2018

(65) Prior Publication Data
US 2019/0199531 A1 Jun. 27, 2019

(30) Foreign Application Priority Data

Aug. 30, 2016 (AU) ................. 2016903450

(51) Int. Cl.
*H04L 29/06* (2006.01)
*H04L 9/32* (2006.01)
(Continued)

(52) U.S. Cl.
CPC .......... *H04L 9/3236* (2013.01); *H04L 9/0618* (2013.01); *H04L 9/0891* (2013.01);
(Continued)

(58) Field of Classification Search
CPC ... H04L 9/3236; H04L 9/0891; H04L 9/3213; H04L 9/0618; H04L 63/102;
(Continued)

(56) References Cited

U.S. PATENT DOCUMENTS 5,263,157 A † 11/1993 Janis
7,685,123 B1 † 3/2010 Thompson
(Continued)

OTHER PUBLICATIONS

Zyskind et al.,, "Decentralizing Privacy: Using Blockchain to Protect Personal Data," 2015 IEEE Security and Privacy Workshops, San Jose, CA, 2015, , doi: 10.1109/SPW.2015.27. pp. 180-184 (Year: 2015).*

(Continued)

*Primary Examiner* — Harunur Rashid
(74) *Attorney, Agent, or Firm* — Crowell & Moring LLP

(57) ABSTRACT

This disclosure describes dynamic access control using capabilities (via dynamic access control interface (150)) on a blockchain system (180). The blockchain data structure is a time-stamped list of blocks, chained together cryptographically. In this disclosure, capabilities can be recorded on a blockchain system (via capabilities storage (170)) and thus access propagation is known. This makes revocation of access achievable by recording a new transaction, which in effect removes the previous authorization. There will be no change to transaction history and instead a new transaction records (170) the current status of the capability. An example implementation on a blockchain system (180) is given in Ethereum, which allows programs called "smart contracts" to run as transactions.

15 Claims, 7 Drawing Sheets

(51) Int. Cl.
  *H04L 9/08* (2006.01)
  *H04L 9/06* (2006.01)
(52) U.S. Cl.
  CPC .......... *H04L 9/3213* (2013.01); *H04L 9/3265* (2013.01); *H04L 63/102* (2013.01); *H04L 2209/38* (2013.01)
(58) Field of Classification Search
  CPC ............... H04L 9/3265; H04L 2209/38; G06F 2221/2145; G06F 2221/2141; G06F 21/604
  See application file for complete search history.

(56) References Cited

U.S. PATENT DOCUMENTS

| | | | |
|---|---|---|---|
| 2009/0031138 A1† | 1/2009 | Nakhjiri | |
| 2015/0127940 A1 | 5/2015 | Polehn et al. | |
| 2016/0028552 A1* | 1/2016 | Spanos ................ | H04L 9/3236 713/178 |
| 2019/0005268 A1† | 1/2019 | Gupta | |

OTHER PUBLICATIONS

Zyskind et al.,, "Enigma: Decentralized Computation Platform with Guaranteed Privacy" Jun. 2015 eprint arXiv: 1506.03471, p. 1-14 (Year: 2015).*
"Object-capability model," retrieved from the Internet on Sep. 22, 2017; https://web.archive.org/web/20140102105610/https://en.wikipedia.org/wiki/Object-capability_model, published Jan. 2, 2014, as per Wayback Machine, 5pgs.
Levy, H.M., *Capability-Based Computer Systems*, Chapter 3, "Early Capability Architectures," pp. 41-62, published 1984; retrieved from the Internet Sep. 22, 2017, at https://homes,cs.washington.edu/~levy/capabook/Chapter3.pdf.
Miller, Mark S., et al., "Paradigm Regained: Abstraction Mechanisms for Access Control," SRL Technical Report SRL2003-03, Department of Computer Science, Johns Hopkins University; Submitted to the Eighth Asian Computing Science Conference, Tata Institute of Fundamental Research, Mumbai, India, Dec. 10-13, 2003, 20 pgs.
Written Opinion of the International Search Authority for corresponding PCT International application No. PCT/AU2017/050928, dated Oct. 6, 2017.
Zyskind, Guy, et al., "Decentralizing Privacy: Using Blockchain to Protect Personal Data," 2015 IEEE CS Security and Privacy Workshops, May 21-22, 2015, pp. 180-184.
Zyskind, Guy, et al., "Enigma: Decentralized Computation Platform with Guaranteed Privacy," Jun. 10, 2015, pp. 1-14.
Extended Search Report for corresponding EP application No. EP 17844684.5 dated Jan. 17, 2020, 27p.
Anonymous, "Capability-based security"; Wikipedia; retrieved from the Internet Jan. 8, 2020; URL:https://en.wikipedia.org/w/index.php?title=Capability-based_security&oldid=735189902; 5p.
Hashemi, Sayed Hadi, et al.; "World of Empowered IoT Users"; 2016 IEEE First International Conference on Internet-of-Things Design and Implementation; Apr. 1, 2016; pp. 13-24.
Asakawa, Naoki, "Potential Explored by 4 Companies", *Nikkei Computer*, No. 916, Japan, Nikkei Business Publications, Inc., Jul. 5, 2016, 5p, in Japanese language.
English language translation dated Aug. 26, 2021 of the First Office Action for JP patent application No. 2019-531494, dated Jul. 13, 2021, 3p.

* cited by examiner
† cited by third party

DYNAMIC ACCESS CONTROL ON BLOCKCHAIN

CROSS-REFERENCE TO RELATED APPLICATIONS

The present application is the U.S. National Stage application of PCT Application No. PCT/AU2017/050928, filed on Aug. 30, 2017, designating the United States, which claims priority from Australian Patent Application No 2016903450 filed on 30 Aug. 2016, the content of which is incorporated herein by reference.

TECHNICAL FIELD

The present disclosure relates to a computer-implemented method, software and system to implement dynamic access control on a blockchain system for use in computer security systems.

BACKGROUND

Access control is an important feature of security in distributed systems, such as controlled information sharing across different departments in an enterprise and different companies in an industry. Different departments in a company often have different policies, different implementations of access control and legacy systems will frequently create issues with interoperability.

In most access control systems, tracking access rights to an individual can be difficult due to the changing roles of an individual and departmental transfers. In addition tracking access rights is made more difficult where access control and access rights are managed by different systems. An audit trail of access rights can be used but it is difficult to correlate and complexity of an audit trail increases due to combinations of security policy models. In a distributed access control system, confinement of access rights is a problem, where access rights might spread or leak beyond known users.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

A computer implemented method for dynamic access control by creating a capability where a capability is a secure reference to an object, where the capability is stored on a blockchain system comprising:
 (a) receiving a request from a sender to create a capability for the object;
 (b) determining existence of the capability for the object for the sender;
 (c) creating the capability for the object for the sender if the capability for the object for the sender is determined not to exist; and
 (d) storing the capability on the blockchain system for the object for the sender, wherein the capability can be used to dynamically determine access control for the object.

This has several advantages and is particularly advantageous due to its use of a blockchain system because of the computationally secure tamper-proof immutable data storage called a distributed ledger, which can be used as an audit trail. Other benefits include allowing various authorisation-delegation policies and dynamic access control. Dynamic access control include the ability to selectively allow or limit propagation of delegations and to revoke delegations. In addition capabilities can be recorded on the blockchain and thus access propagation is known. This allows for a fine-grained control of access rights, which helps solve the Confused Deputy problem depending on how granular the access rights are. The Confused Deputy Problem happens when a program which has access rights given to it for one purpose applies those access rights for some other purpose that is contrary to the original intent of the access rights, and therefore allows something that it should not allow. A classic example of this problem involves a program that is allowed to write into a directory, which contains a log file and billing information file. The program takes a parameter of a file to which it will write debugging information. A user can then supply the billing information file into the program and thus overwriting the billing information. This may not have been intended during system design, but if the program has the necessary access rights, it may perform this action, perhaps under malicious or erroneous user control. The invention is advantageous as it helps overcome this issue.

The method may further comprise sending a success message to the sender.

A computer implemented method for dynamic access control by granting a capability where a capability is a secure reference to an object, where the capability is stored on a blockchain system comprising:
 (a) receiving a request from a sender to grant a capability for the object for a target;
 (b) determining access rights for the sender for the object for the target;
 (c) determining whether the access rights allow for the capability for the object to be granted for the target; and
 (d) storing the capability on the blockchain system for object for the target wherein the capability can be used to dynamically determine access control for the object.

Step (c) may comprise determining whether a capability has been granted for an object.

The capability for the object for the target may be a subset of the capability for the object for the sender.

A non-transitory computer readable medium has computer readable instructions for creating a capability on a blockchain according to the above method.

A system for dynamic access control by creating a capability where a capability is a secure reference to an object, where the capability is stored on a blockchain system, wherein the system comprises:
 one or more smart contract instances executing on the blockchain to:
  (a) receive a request from a sender to create a capability for the object;
  (b) determine existence of the capability for the object for the sender;
  (c) create the capability for the object for the sender if the capability for the object for the sender is determined not to exist;

(d) store the capability for the object for the sender, wherein the capability can be used to dynamically determine access control for the object.

A system for dynamic access control by granting a capability where a capability is a secure reference to an object, where the capability is stored on a blockchain wherein the system comprises:
  one or more smart contract instances executing on the blockchain to:
    (a) receive a request from a sender to grant a capability for the object for a target;
    (b) determine access rights for the sender for the object for the target;
    (c) determine whether the access rights allow for the capability for the object to be granted for the target; and
    (d) store the capability for the object for the target, wherein the capability can be used to dynamically determine access control for the object.

A computer implemented method for dynamic access control by deleting a capability where a capability is a secure reference to an object, where the capability is stored on a blockchain system comprises:
  (a) receiving a request from a sender to delete a capability for the object;
  (b) determining existence of the capability for the object for the sender; and
  (c) deleting the capability for the object for the sender if the capability for the object for the sender is determined to exist.

A computer implemented method for dynamic access control by revoking a capability where a capability is a secure reference to an object, where the capability is stored on a blockchain system comprises:
  (a) receiving a request from a sender to revoke a capability for the object for a target;
  (b) determining access rights for the sender for the object for the target;
  (c) determining whether the access rights allow for the capability for the object to be revoked for the target;
  (d) revoking the capability for the object for the target.

The computer implemented method may further comprise determining whether the capability is not a master capability.

A system for dynamic access control by deleting a capability where a capability is a secure reference to an object, where the capability is stored on a blockchain system wherein the system comprises:
  one or more smart contract instances executing on the blockchain to:
    (a) receive a request from a sender to delete a capability for the object;
    (b) determine existence of the capability for the object for the sender; and
    (c) delete the capability for the object for the sender if the capability for the object for the sender is determined to exist.

A system for dynamic access control by revoking a capability where a capability is a secure reference to an object, where the capability is stored on a blockchain system wherein the system comprises:
  one or more smart contract instances executing on the blockchain to:
    (a) receive a request from a sender to revoke a capability for the object for a target;
    (b) determine access rights for the sender for the object for the target;
    (c) determine whether the access rights allow for the capability for the object to be revoked for the target;
    (d) revoke the capability for the object for the target.

BRIEF DESCRIPTION OF DRAWINGS

Examples of the present disclosure will be described with reference to.

DESCRIPTION OF EMBODIMENTS

Figure 1:
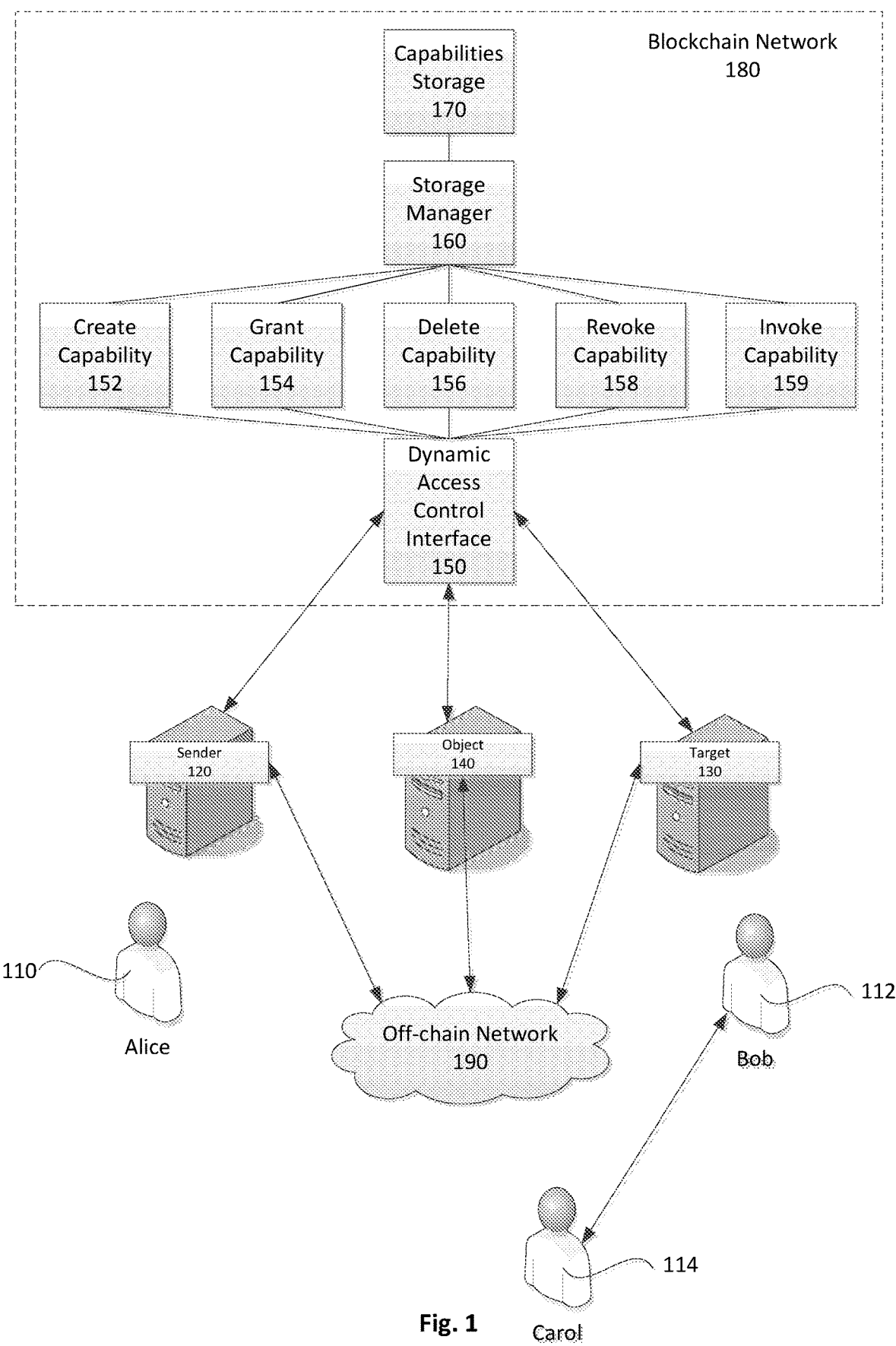
FIG. 1 illustrates an exemplary application scenario.

The present invention generally relates to methods software and system for implementing dynamic access control on a blockchain system. In this disclosure, the integrity of smart contracts ensures secure processing of the access control logic and management. Smart contracts form part of the computational infrastructure of many blockchain systems which can be used to perform, as well as store the history of, capability operations.

In the present disclosure, capabilities are implemented on the blockchain system and operations on the capabilities are stored as transactions. The blockchain therefore becomes a practically immutable and unforgeable history of all the operations on the capabilities. A copy of the blockchain represents the current state of the capabilities. In one example, capabilities records are stored in a smart contract storage space. This storage space may be any data structure including variables. Operations on the capabilities modify the variables to keep track of the latest state of the capabilities records. The transactions to trigger the operations are recorded on the blockchain to provide an audit trail for changes and modifications to the capabilities records.

Blockchain

The blockchain was designed to be a public shared ledger maintained by all the nodes within a peer-to-peer network. A blockchain system does not rely on any central trusted authority like traditional banking and payment systems. Instead, trust is achieved as an emergent property from the interactions between nodes within the network. A full copy of the blockchain contains every transaction ever executed within the blockchain network, therefore a party transacting on the blockchain can verify with a high level of certainty that the other party is able to transact as the other party claims. A further consequence is that the blockchain is provably robust against forging or hacking. One significant consequence of this is that it is not necessary to utilise a trusted third party, such as a bank for a transaction of money or a trusted security program for a transaction of access rights.

The blockchain as a concept was initially defined in the infrastructure of Bitcoin. Since then, the concept has been generalised into distributed ledgers that use the blockchain to verify and store any transactions without needing cryptocurrency or tokens. Many cryptocurrencies now use blockchains as the basis of their platform. Popular blockchain systems include Bitcoin and Ethereum.

Transactions

As above, a blockchain is essentially a list of transactions shared by all nodes participating in a system based on an agreed protocol. Each transaction represents a transfer of a specific quantity of a digital asset from one party's address to another party's address. Thus an address functions similar to a bank account. For example Alice can pay Bob 5 Bitcoins by creating a transaction on the blockchain and transfers the 5 Bitcoins from one of her addresses and specifies Bob's address as the output.

Blockchains record all transactions that have occurred, and provide tamperproof immutable data storage called a distributed ledger. The whole network of participating entities reach consensus on transactions included into the distributed ledger. A transaction is an identifiable data package that essentially can represent anything users wish to transact in. In many blockchain systems the data package is an indication of monetary value such as Bitcoin or Ether, but they can also include parameters and results of function calls in a smart contract. The integrity of the transactions in a blockchain system is ensured by cryptographic techniques. A computer that is connected to and participating in the blockchain system that contains a full copy of the currency's blockchain is known as a 'full node'.

Blocks

In blockchain systems, transactions are aggregated into blocks. Each block contains a mathematical function calculation, called a hash, of the previous block. This mathematical function calculation is easy to calculate given a specific transaction but difficult to reverse given a specific hash. This represents a means to determine whether content in the transaction has been modified in any way. By including the hash in the transaction, this creates a chain where any changes made to a block will change that block's hash, which must be recomputed and stored in the next block. This changes the hash of the next block, which must also be recomputed and so on until the end of the chain.

Therefore, each block is also linked to the previous block (the 'parent' block) by containing a reference the previous block. This has the effect of creating a chain of blocks from the current block to the very first block known as the genesis block. Each block is guaranteed to come after the previous block chronologically because the previous block's hash would otherwise not be known. Each block is also computationally impractical to modify once it has been in the chain for a while (typically in Bitcoin this is around 60 minutes or 6 blocks on average) because every block after it would also have to be regenerated. These properties are what make a transaction relating to a capability on the blockchain difficult to forge.

Smart Contracts

Smart contracts in a blockchain system are intended to replicate the legal concept of contracts. That is, where contracts are mutual agreements that impose obligations on the parties to the contract, a smart contract is a way of automatically imposing obligations or conditions on the transaction.

Bitcoin and Ethereum (and most other blockchain systems) utilise scripts for the purpose of verifying transactions. It is possible that a smart contract can be implemented as a script and it would operate the same as the way a normal transaction would be verified. Although this is the practice that Bitcoin has adopted, this is quite difficult because the script has to execute in order for the transaction to be verified. In Ethereum, smart contracts are distinct from verifying a transaction. As a result smart contracts can exist independently of a transaction that initiated the contract. Other differences include that the smart contract has to be deployed before it can be executed and once deployed the smart contract will execute unless explicitly terminated. In both Bitcoin and Ethereum, the script contains all the function calls (op codes) that are required for the contract to be performed automatically. All nodes on both blockchain systems execute the script.

There are a number of limitations to the use of scripts in blockchain systems. One such limitation for Bitcoin is that the scripting language is considered not Turing-complete. A consequence of is that a Bitcoin script is not used to create any loops. This restriction may prevent attackers from running scripts on the Bitcoin system that loop infinitely that act as a Denial of Service (DOS) type of attack. In contrast, Ethereum has a built-in Turing-complete script language for writing smart contracts. The way Ethereum overcomes the potential for a DOS attack is that the parties transacting in the currency are required to pay a fee proportional to the CPU cycles needed by the script (this is known as Gas in Ethereum). A script cannot therefore loop infinitely as the attacker would require an infinite amount of currency to pay for the script to execute.

In the literature, the term 'smart contract' is used interchangeably to refer to both the code that is used to execute a smart contract and the actual executing or executed smart contract. For clarity, in this disclosure the term 'process instance' refers to the execution, and services provided by the smart contract. The term 'script' refers to the smart contract code that can be executed as a process instance.

The current disclosure uses the term 'blockchain' to refer to actual blockchain itself (that is, the public shared ledger with blocks added sequentially). The current disclosure also uses the term blockchain in relation to a blockchain system and a blockchain network. The term 'blockchain system' is intended to refer to all the components that make the blockchain operate. This includes the wallet, code, transactions, the blockchain network, as well as the blockchain itself. Examples of blockchain systems used in the disclosure include Bitcoin and Ethereum. Where the term blockchain network is used (for example the Ethereum blockchain network), this is intended to refer to the computers running the blockchain code that are able to communicate with each other via a communications network such as the Internet. Computers in the blockchain network are referred to as nodes, and a full node is a computer in the blockchain network that contains a copy of the entire blockchain.

The following is an illustrative example. Although it describes the use of Ethereum, this is intended simply to be illustrative of a blockchain system. The primary reason for this is that Ethereum natively supports smart contacts. Smart contracts are used as capabilities holding objects on the Ethereum blockchain. They contain code functions and can interact with other contracts, create new contracts, make decisions, store data, and send Ether to others.

Blockchain Components

The current disclosure refers to three distinct components on the blockchain. These components are:

Dynamic Access Control Interface

This component connects the blockchain process execution to the outside world. The interface makes available an external Application Programmable Interface (API) functions for a sender to call. A sender is a user process that initiates a capabilities operation.

Operations

The function calls from the interface may then call one of the following operations 'Create Capability' 152, 'Grant Capability' 154, 'Delete Capability' 156, 'Revoke Capability' 158 and 'Invoke Capability' 159. These operations may be process instances on the blockchain. These process instances handle much of the process logic of the creating, granting, deleting and revoking capabilities and may store the process state on the blockchain as well.

Storage Manager

This is the component that handles all the interactions with the capabilities database. All the above operations at least require access to the capabilities database, and may involve changing the data stored in the database as well. Typically a storage manager would keep track of any capabilities transactions that are added to the blockchain.

Off-Chain Components

There are three main off-chain components in the system.

Sender

As above, a sender is the user process that initiates a capabilities operation.

Object

A capabilities operation is typically made in relation to an object. Typically a user creates an object, and then grants capabilities to that object to other users. The object is typically a user process or resource and may be any user process or kind of computing resource. Objects may be digital objects, such as documents and files, or object may be physical objects such as buildings or sites. Objects may also be electronic access to computer systems. Within a computer system an object for example can be a variable, a data structure, a function, or a method. But an object could also be external to a computer such as a network resource, for example, another computer, a network printer or storage. An object could also be a physical object represented by a computing resource such as a character string that acts as a unique identifier for that object.

Target

The target is the user process that may acquire or lose capabilities according to the sender's capabilities operation.

Example System

FIG. 1 is an example illustration of the proposed system. In this system, Alice 110, Bob 112 and Carol 114 are users. There are a number of off-chain programs: sender 120, target 130 and the object 140. As above, a sender is usually the program that initiates a capabilities request, and a target is optionally specified if the sender wishes to change the target capabilities on their behalf. Typically the object is what the sender 120 or target 130 is seeking access to or, alternatively, in relation to which one or more capabilities are granted or modified.

On the blockchain network 180, there are a number of process instances of smart contracts. Dynamic Access Control Interface is a process instance of a smart contract that allows for external API calls. There are also a number of process instances of smart contracts relating to specific operations on capabilities: 'Create Capability' 152, 'Grant Capability' 154, 'Delete Capability' 156, 'Revoke Capability' 158 and 'Invoke Capability' 159. There is also a process instance of a smart contract that operates as a storage manager and this process instance interacts with a capabilities storage 170 process instance.

These operations and variants of the operations above can be used to derive more sophisticated operations. This may be done where there are different kind of rights that can be supported. The capability used in this section is just an illustrative representation and is in no way the only representation of rights.

As mentioned above, the operations as outlined above 'Create Capability' 152, 'Grant Capability' 154, 'Delete Capability' 156, 'Revoke Capability' 158 and 'Invoke Capability' 159 modify the variables in the smart contract storage space to keep track of the latest state of the capabilities records. The transactions to trigger the operations are recorded on the blockchain to provide an audit trail for changes and modifications to the capabilities records.

Capability

Capabilities were proposed by Dennis and Van Horn as a technique for describing the semantics of controlled access to data. A capability in this disclosure is a secure object reference. A capability is a reference to an object where the system maintains a set of privileges or access rights to that object associated with that capability. In a capability-based security model, the secure object reference is a reference to both an object and access rights. The access rights are a set of restrictions of access to an object, where access can include entering or using the object. Capabilities, and in particular access capabilities may relate to digital objects, such as document and files, as well as physical objects such as buildings or sites and electronic access to computer systems.

A capability is communicable, in the sense that it can be sent or communicated from one party to another party (such as a sender to a target or a user process to any other user process). The capability may be communicated as data much like any other communication. This allows for a user process to determine where the source of the capability came from.

Further, a capability is secure in that the system provides protection such that the object reference is not easy to copy or computationally infeasible to forge. In this disclosure, the protection is enabled by the use of a blockchain system. The capabilities as protected object references can be created only, in one embodiment, through the use of privileged instructions in a smart contract which may be executed on the blockchain to give effect to the capability on the blockchain system.

Capability-Based Access Control

A capability-based access control system blocks access to objects unless the user possesses a valid capability that unlocks the object. Therefore, in order to access an object, a user must use a capability. It is conceptually analogous to an object in a room with a locked door, where a user wishing to access an object first requires a valid key to unlock the door.

Capability-based access control is based on the possession of a capability, so just as in the key and lock scenario where a key can also be allocated to and redistributed by a user; a capability can be propagated or passed around between users. The confinement problem occurs when there is a leakage of capability, which results from an inability to restrict capability propagation.

A user process that possesses a capability may be given the ability to interact with the object in certain limited ways as determined by the access rights for that capability. Examples of access rights include read, write, read/write, and storage locations permitted or storage locations denied.

This distinguishes a capability from other security model types which generally operate as hierarchical protection, where there are layers of access rights given to user processes. In the hierarchical protection model, the most trusted user processes are given the highest amount of access rights and least trusted user processes are given the lowest amount of access rights. In these types of systems, a forgeable reference to an object such as a path name is not sufficient to determine access rights, and access depends on the ambient authority of the user process that requests access to an object.

Create Capability

The following describes an example method for utilising the example system as illustrated in FIG. 1. Alice 110 has access to a sender program 120 and Bob has access to a target program 130.

Initially Alice 110 creates an object 140. Alice as owner of the object has full access to the object, and therefore is entitled to perform any operations on the object. Alice's sender program 120 accesses the API of the Dynamic Access Control Interface 150 to first create a capability for the sender 120 for the object 140.

Figure 2:
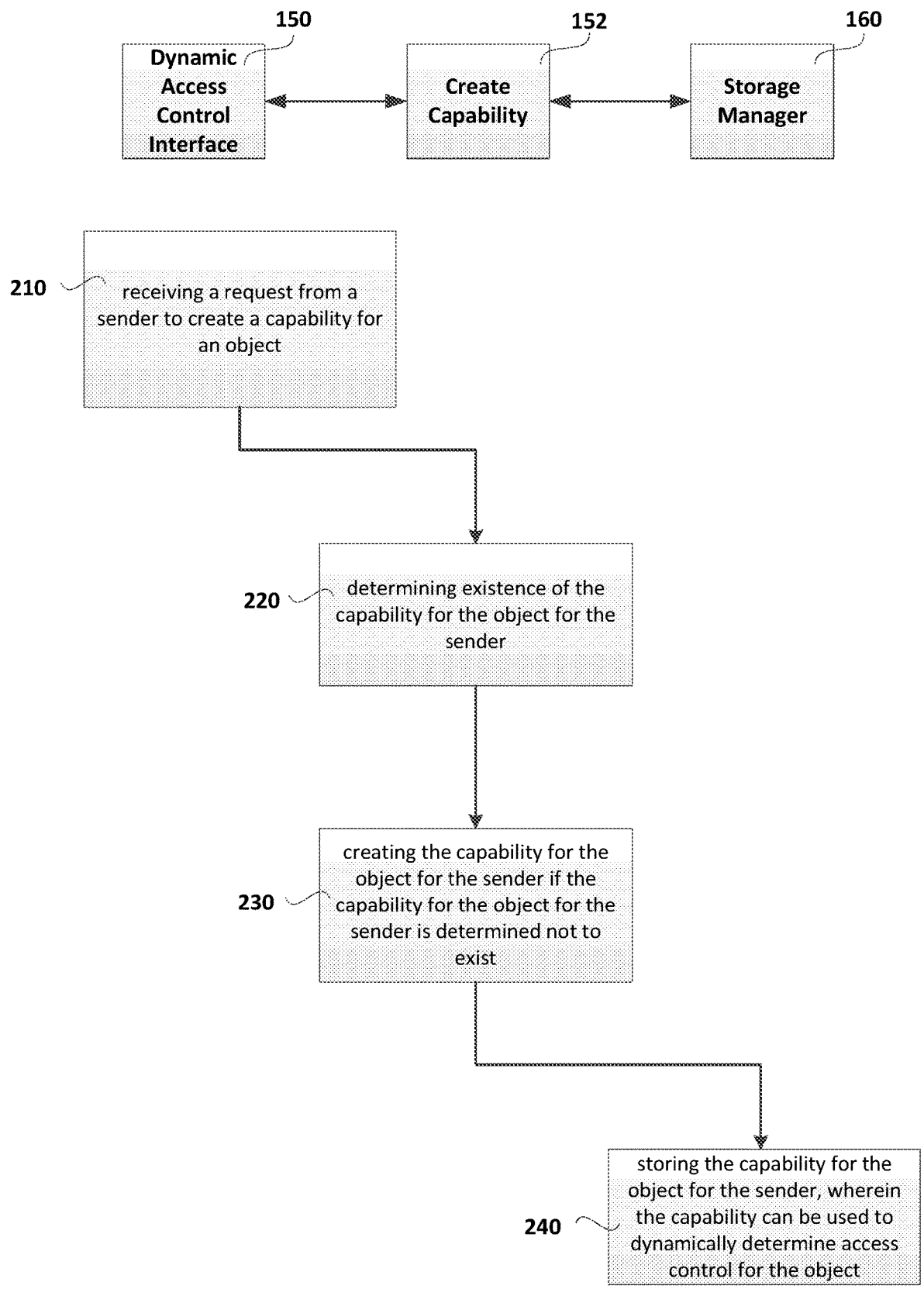
FIG. 2 illustrates a computer-implemented method for creating a capability.

As illustrated in FIG. 2, the Dynamic Access Control Interface 150 receives 210 a request from a sender to create a capability for an object. The Dynamic Access Control Interface 150 then calls the create capability 152. The create capability 152 process instance first determines 220 existence of the capability for the object for the sender 120. That is, there can only be one capability for an object for a sender so this step is to ensure that a capability has not already been created. The existence of the capability for the object for the sender may be determined by inquiring whether such a capability is stored by the storage manager 160. The storage manager 160 may inquire from one or more capabilities storage 170. If the capabilities storage 170 does not contain the capability then the capability is determined not to exist. If the capability for the object for the sender is determined not to exist, then the create capability 152 process instance may create the capability for the object for the sender.

Once the capability for the object for the sender has been created the storage manager 160 may store the capability. The data structure of a capability can be represented as a tuple of (object,rights,derivation) where object and rights are strings of arbitrary length. The storage manager may use this representation when storing the capability. The storage manager may obtain a hash of a transaction when storing the capability on the blockchain.

The following is an example algorithm for Create Capability:

Input: object
1 senderCaps=capsdb.get(msg.sender)
2 for all cap in senderCaps do
3   if cap.object==object then
4     return false
5   end if
6 end for
7 newCap={object,"master",0x0}
8 senderCaps.push(newCap)
9 return true Grant Capability Initially Alice 110 trusts Bob 112, and Alice 110 wishes for Bob 112 to have full access to her object 140. Alice would like to grant Bob's access to the object 140. The system handles this scenario with the Grant Capability operation.

Figure 3:
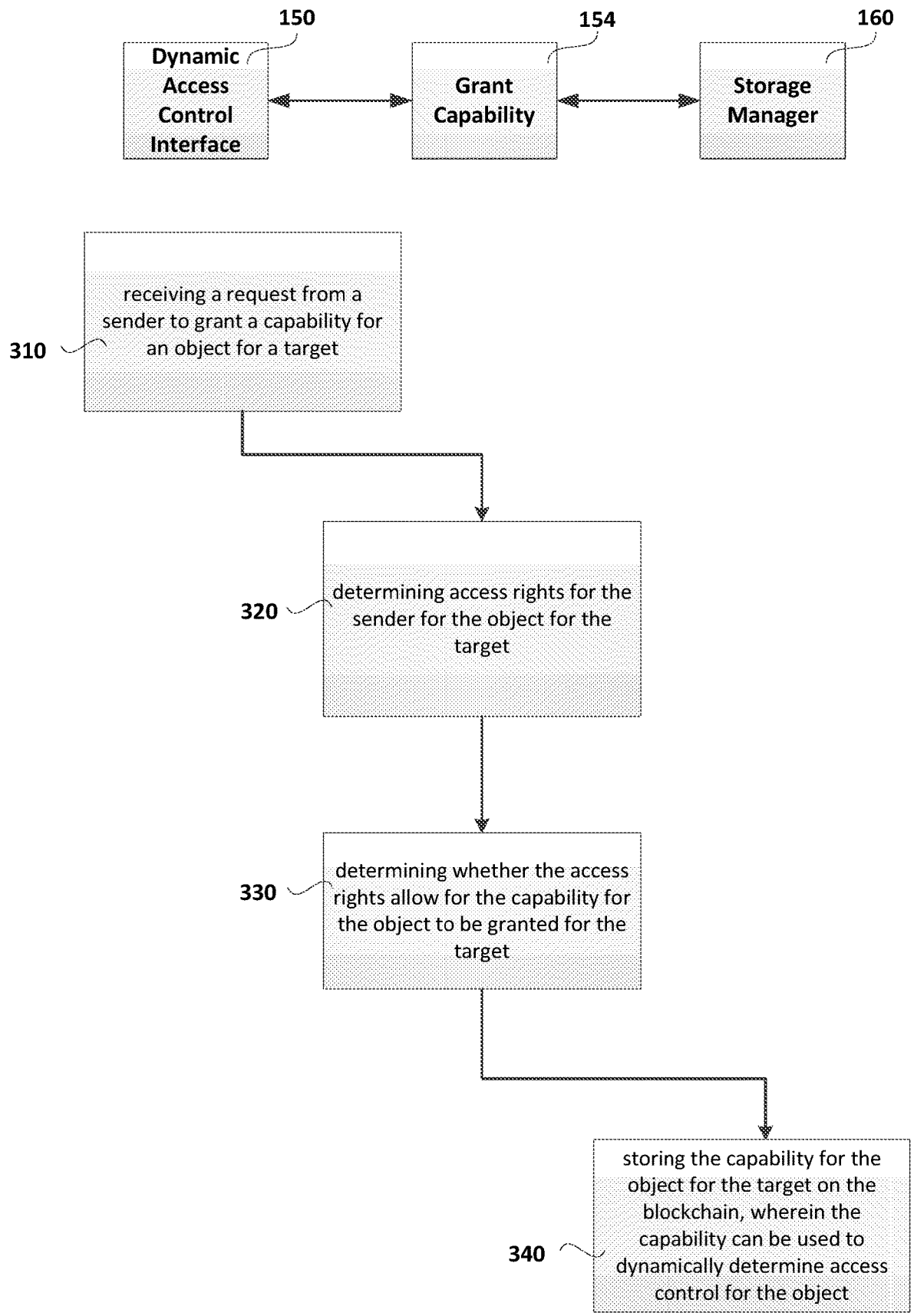
FIG. 3 illustrates a computer-implemented method for granting a capability.

As illustrated in FIG. 3, the Dynamic Access Control Interface 150 receives 310 a request from a sender to grant a capability for an object for a target. The Dynamic Access Control Interface 150 then calls the grant capability 154 process instance. The grant capability 154 process instance first determines 320 access rights for the sender 120 for the object 140 for the target 130. That is, the grant capability process instance ascertains what access rights the sender has for the object. The grant capability process instance then determines 330 whether the access rights allow for the capability for the object to be granted for the target. That is, the grant capability process instance determines 330 whether the sender' access rights enable the sender to grant a capability to the target 130 for the object 140. Once the capability for the object for the sender has been granted the storage manager may store 340 the capability on the blockchain.

Although in this example, the steps 320 and 330 are performed by the same process instance, it is possible that they can be performed by different process instances. Indeed, as with all the examples, each of the steps could be performed within one process instance or across multiple process instances.

The following is an example algorithm for Grant Capability:

Input: object,target,rights
1    senderCaps = capsdb.get(msg.sender)
2    for all cap in senderCaps do
3        if cap.object == object then
4            if ("master" in cap.rights) OR ( "grant" in cap.rights) then
5                targetCaps <- capsdb.get(target)
6                if (("master" NOT in targetCaps) AND (rights != "master"))
7                    newCap = {object,rights,msg.sender}
8                    targetCaps.push(newCap)
9                end if
10               return true
11           end if
12       end if
13   end for
14   return false Delete Capability It may be the case that at some point Alice 110 no longer has any need to share the object 140 with Bob 112. In this case, Alice may simply wish to delete the capability for the object 140.

Figure 4:
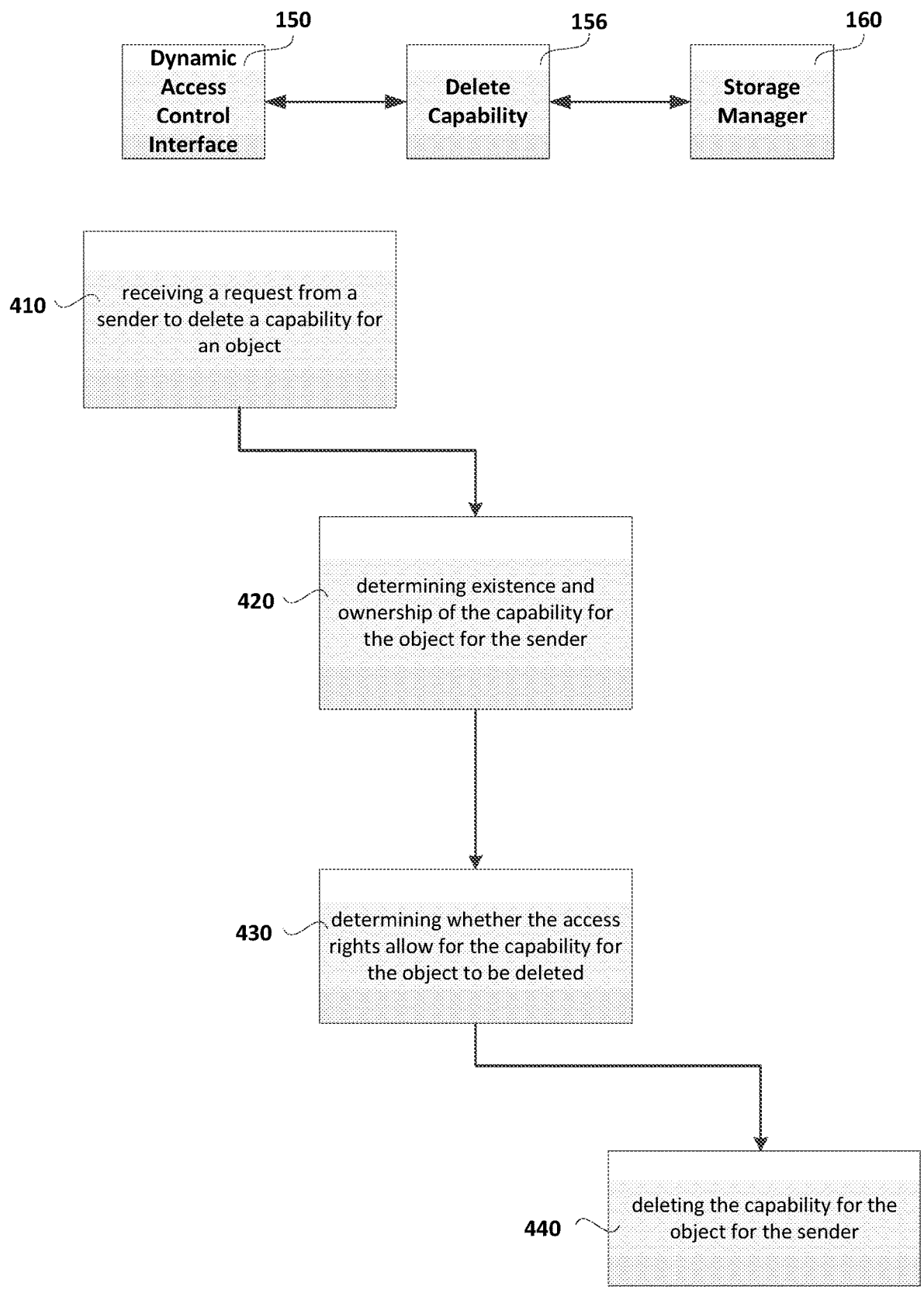
FIG. 4 illustrates a computer-implemented method for deleting a capability.

FIG. 4 is an example method for a delete capability operation. In this example, the Dynamic Access Control Interface 150 receives 410 a request from a sender to delete a capability for an object. The Dynamic Access Control Interface 150 then calls the delete capability 156 process instance. The delete capability 156 process instance first determines 420 existence and ownership of the capability for the object for the sender. That is, the delete capability process instance ascertains what access rights the sender has for the object, and in particular it determines whether the sender is the owner. The delete capability process instance then determines whether the access rights allow for the capability for the object to be deleted. That is, the delete capability process instance determines 430 whether the sender's access rights enable the sender to delete a capability for the object 140. Typically, if the sender is determined to be the owner of the object 140 then the sender would be able to delete the capability for the object. Subsequently, the storage manager may delete 440 the capability. This is the step that actually removes the capability from the database.

An example algorithm for the delete capability is:

Input: object
1    senderCaps = capsdb.get(msg.sender)
2    for all cap in senderCaps do
3        if cap.object == object then
4            if ("master" in cap.rights) then -continued

```
5           result=
revokeAllNonMasterCap(msg.sender,object)
6           if result then
7               senderCaps = senderCaps.remove(cap)
8               return true
9           end if
10      end if
11   end if
12  end for
13  return false
```

A second example algorithm for the delete capability is:

```
Input: object
1   senderCaps = capsdb.get(msg.sender)
2   for all cap in senderCaps do
3       if (cap.object == object) && ("master" in cap.rights) then
4           for all key in capsdb do
5               caps = capsdb.get(key)
6               for all c in caps do
7                   if (c.object == object) && ("master" NOT in c.rights) then
8                       caps = caps.remove(c)
9                   end if
10              end for
11          end for
12          return true
13      end if
14  end for
15  return false
```

Revoke Capability

After Alice 110 and Bob 112 grew apart, Alice 110 no longer trusts Bob 112 to have access to her object 140. Alice would like to invalidate Bob's access to the object 140. Unfortunately, Alice had granted Bob full access to the object, which means Bob can delegate that access to his friend, Carol 114. In this case, access has propagated beyond Alice's knowledge. This is what is referred to as the confinement problem. The Revoke Capability 158 operation can handle this scenario by revoking and deleting all the capabilities that are derived from Bob 112.

Figure 5:
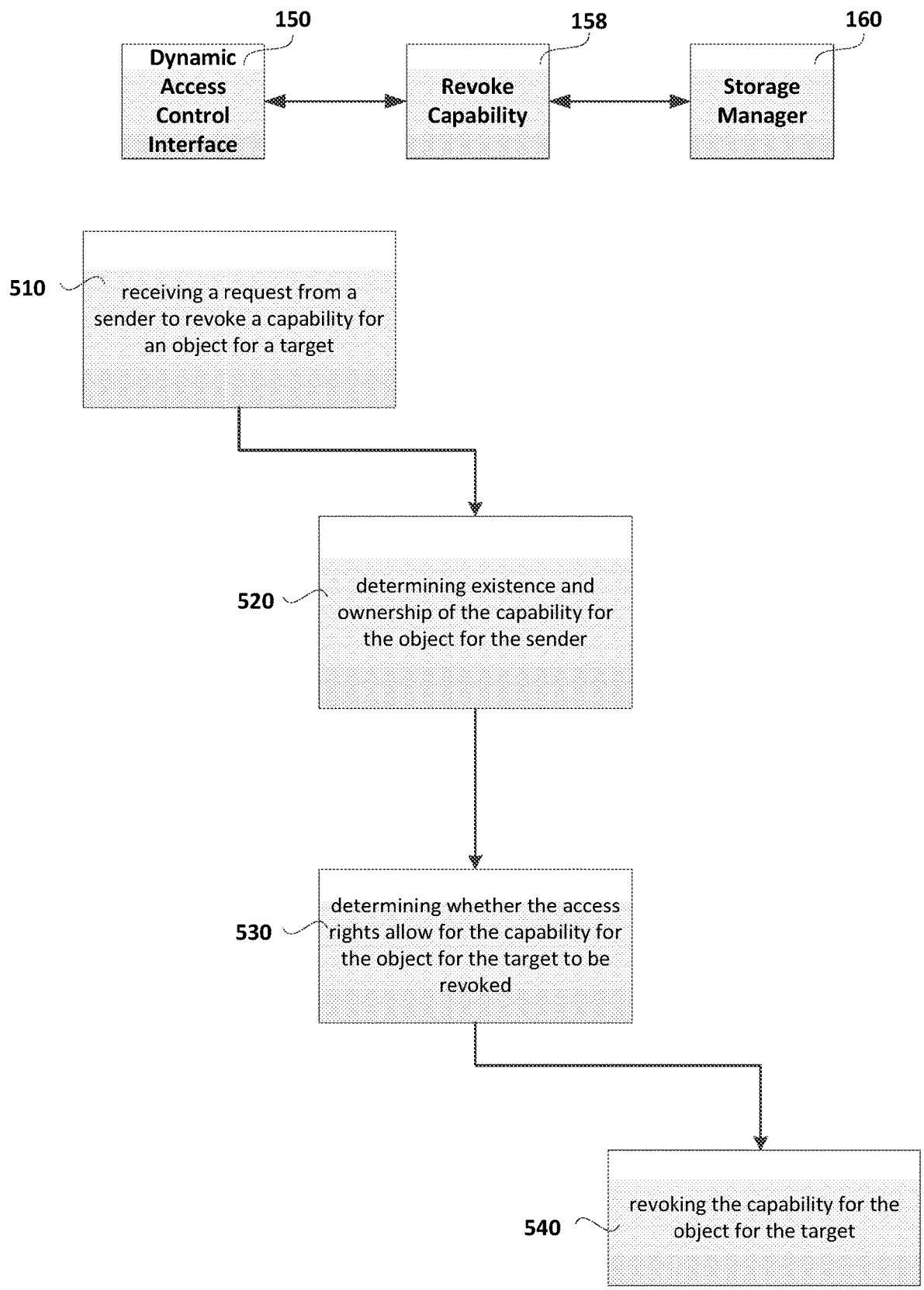
FIG. 5 illustrates a computer-implemented method for revoking a capability.

FIG. 5 is an example method for a revoke capability operation. In this example, the Dynamic Access Control Interface 150 receives 510 a request from a sender to revoke a capability for an object. The Dynamic Access Control Interface 150 then calls the revoke capability 158 process instance. The revoke capability 158 process instance first determines 520 existence and ownership of the capability for the object for the sender. That is, the revoke capability process instance ascertains what access rights the sender has for the object, and in particular it determines whether the sender is the owner.

The revoke capability process instance then determines 530 whether the access rights for the sender for the object allow for the capability for the object for the target to be revoked. That is, the revoke capability process instance determines whether the sender' access rights enable the sender to revoke a capability for the object 140 for the target. Typically, if the sender is determined to be the owner of the object 140 then the sender would be able to revoke the capability for the object. Subsequently, the storage manager may remove 540 the capability. This is the step that removes the capability from the database.

The following is an example algorithm for Revoke Capability:

```
Input: object,target,rights
1   senderCaps = capsdb.get(msg.sender)
2   for all cap in senderCaps do
3       if cap.object == object && (("master" in cap.rights OR ("revoke" in cap.rights)) then
4           targetCaps = capsdb.get(target)
5           for all c in targetCaps do
6               if c.object == object then
7                   if rights in c.rights then
8                       targetCaps = targetCaps.remove(c)
9                   end if
10              end if
11          end for
12          return true
13      end if
14  end for
15  return false
```

Invoke Capability

Bob 112 may wish to perform an activity on an object 140. The service resource owner will check that Bob is allowed to perform the activity by calling an invoke capability operation.

Figure 6:
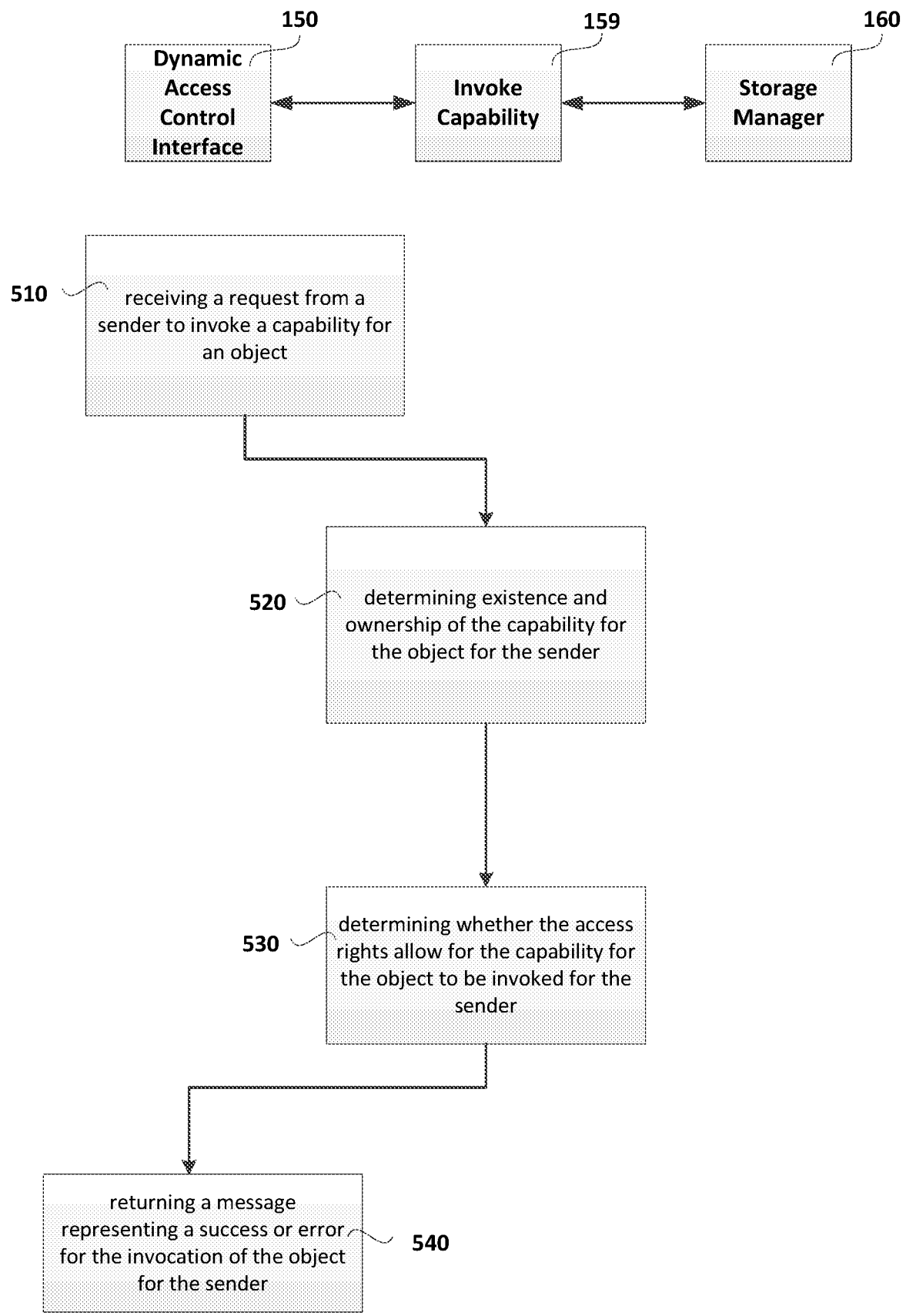
FIG. 6 illustrates a computer-implemented method for invoking a capability.

FIG. 6 is an example method for a invoke capability operation. In this example, the Dynamic Access Control Interface 150 receives 610 a request from a sender to invoke a capability for an object. The Dynamic Access Control Interface 150 then calls the invoke capability 159 process instance. The invoke capability 159 process instance first determines 620 existence and ownership of the capability for the object for the sender. That is, the invoke capability process instance ascertains what access rights the sender has for the object, and in particular it determines whether the sender is the owner.

The invoke capability 159 process instance then determines 630 whether the access rights for the sender for the object allow for the capability for the object for the target to be invoked. That is, the invoke capability process instance determines whether the sender' access rights enable the sender to invoke a capability for the object 140 for the target. Typically, if the sender is determined to be the owner of the object 140 then the sender would be able to invoke the capability for the object.

The following is an example algorithm for Invoke Capability:

```
Input: object,target,rights
1   targetCaps = capsdb.get(target)
2   for all cap in targetCaps do
3       if cap.object == object then
4           if rights in cap.rights then
5               return true
6           end if
7       end if
8   end for
9   return false
```

Success and Failure Messages

In any of the above operations, the method may further comprise returning a success or error message back to the calling process instance or to the sender. The success message indicates that the capability operation completed as normal, whereas an error message is an indication that the capability operation did not proceed. An error message may indicate for example that the access rights did not allow for the operation to proceed. For example, subsequently to the method as described above for Invoke capability, the invoke capability 159 process instance may return 640 a success or error message for the invocation of the object for the sender.
Hash Value In any of the above operations, may further comprise returning a hash value to the sender. In one example, the hash value is of a transaction to revoke a capability to Bob 112. The hash value can then be used to look-up the transaction in a blockchain. Looking up a transaction may be useful for examining the transaction time or content or to determine the current state of the capabilities database. For example, the transaction record may be accessed using the hash of a transaction as a transaction identifier using a publicly available facility such as www.blockchain.info.

Figure 7:
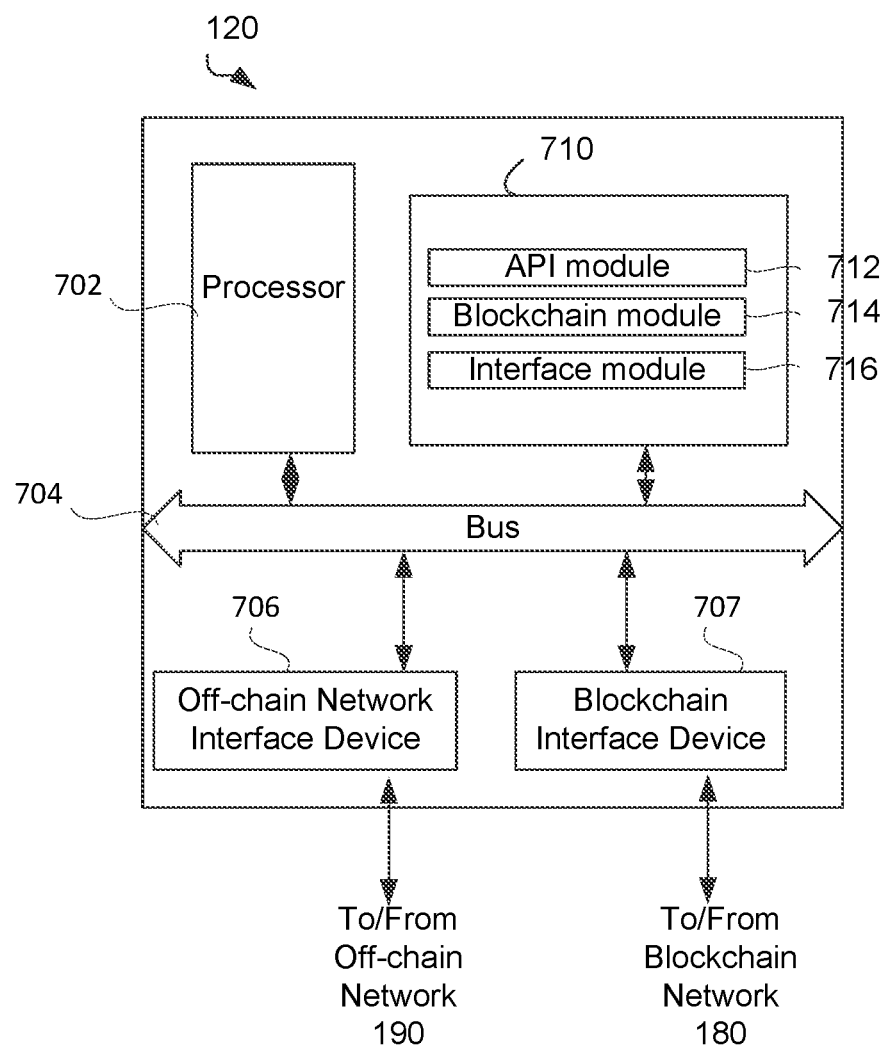
FIG. 7 illustrates an example sender.

The actual hashing algorithm used to create the hash depends on the blockchain system. For example, the hash of the transaction may be determined using the SHA-256 algorithm to create a 256-bit representation of the information. It is to be appreciated that other hash algorithms may be used, including other algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on Zémor-Tillich hash function and knapsack-based hash functions.
Deploying Smart Contracts In Ethereum, an example blockchain system, a smart contract has to be deployed before it can be executed. To deploy the smart contract as a process instance, the compiled code of the script and the Application Binary Interface (ABI) are required. The ABI defines how to interact with the Dynamic Access Control Interface 170. Whereas an API defines an interface for source code to be utilised, an ABI defines the low-level binary interface between two or more pieces of software on a particular architecture. The ABI defines how the process instance will interact with itself, how the process instance interacts with the Ethereum network 150, and how the process instance 170 interacts with any code libraries. When compiling the smart contract script, a compiler will typically produce both the compiled code and the ABI. Both the sender 120 and target 140 may have access to the ABI for the Dynamic Access Control Interface 170 so that it can interact with the Dynamic Access Control Interface 170.
Example Sender The sender 120 shown in FIG. 7 includes a processor 702, a memory 710, a network interface device 706 and an interface device 708 that communicate with each other via a bus 704. The memory stores instructions 712, 714, and 716 and data for the processes described with reference to FIGS. 1 to 6, and the processor performs the instructions from the memory to implement the processes.

The processor 702 performs the instructions stored on memory 710. Processor 702 receives an input by a user 110 to the process from the off-chain interface device 706. Processor 702 determines an instruction according to the API module 712. The instruction may be a function to communicate with the Dynamic Access Control Interface 150. The processor 702 may execute instructions stored in the interface module 716 to communicate with an interface 180 on the off chain network 190.
Variant Implementations and Applications It is intended that capability-based access control is one component of a computer security system. Most computer security systems would need some form of authentication. Authentication may be handled by the underlying blockchain system such as Ethereum as described in the examples given in this disclosure. For example, there may be an object associated with an address of a person, but this system presumes that person is correctly authenticated and the right person associated with that address. It is to be noted that many variants of authentication can be used with this capability-based system.

An example application is a network file system that interacts with a blockchain system to utilise capabilities as described in the present disclosure. In this way, a user process may be granted a capability of read access to a file in the network file system. The user process may request read access to the file and pass the capability as a parameter. The network file system may call the invoke capability function to ensure that the user process has the appropriate read access to the file.

A further example application is for the real-time monitoring of access to an object which may have resource limitations. That is, the use of the approach in the present disclosure means that it may be possible to monitor the resource usage of objects because the activity of a capability can be tracked. For example, if there are 20 user processes given read capabilities to an object that has a resource limitation of 15 read operations, then only three-quarters of the user processes can access the object. Instead it may be the system imposes a fixed limit of 15 where a capability to access the object is revoked and reallocated once a user process has performed the appropriate action, or alternatively the access may be communicated to another user process that requests access. This is in contrast to an ambient authority system where a user process would generally request the access when the access was required. The system may grant access or deny it when the user process requests it.

Capabilities as described in the present disclosure is particularly applicable for delegating access. Delegated authorisations may occur in many situations. In a real-world example, a government may have power to generate road rules, but the government may delegate the actual creation of road rules to a person or government body. The delegated person may have the same access or less than that given to the government. For example, a government may have access to create and maintain traffic rules, but may delegate access to the Roads and Maritime Services as a government body to update the rules on a regular basis. The capability approach of the present disclosure makes it straightforward to implement such an application.

The above capability-based access control on a blockchain system may be used for automated access control. One form of automated access control is where a sender or certain categories of sender may be delegated certain capabilities. One such example may be certification performed by devices. In this example, a category of device such as a water quality measurement device that performs quality assurance of the drinking quality of water may be given access to an object (such as a database) to record measurements of water quality across a city's water supply. Given that the device is a specific category of water measurement device, there may be a capability that is delegated to all water measurement devices in that category to have access to the measurement database. This is advantageous as the access control to an object can be automated, and the device does not need to be manually authorised.

Variations on the above disclosed operations may support other kinds of policies. Those policies include delegation, where a capability is transferred to another user or replicated from one user 'onto' another user. The policies also include revocation policies where a first user has a capability and a second user can have the capability to revoke the capability of the first user. The policies further include access policies which are more elaborate than per-user access. For example, some documents may be accessed by a specific role where the association of roles and users is separately managed by the system.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A computer implemented method, performed by one or more smart contract instances executing on a blockchain system, and for dynamic capability-based access control granting a capability for an object, where the capability is a secure reference to the object, and where the capability is stored on the blockchain system, the computer implemented method comprising:
receiving a request from a sender to grant a capability for an object for a target, the sender being a first user process that initiates a capabilities operation and the target being a second user process that acquires capabilities according to the capabilities operation;
determining access rights for the sender for the object for the target;
determining whether the access rights allow for the capability for the object to be granted for the target;
storing the capability for the object for the target on the blockchain system, wherein the capability is for dynamically determining access control for the object;
determining whether the access rights allow for the capability for the object to be revoked for the target; and
revoking the capability for the object for the target.

2. A computer implemented method for granting a capability on a blockchain system according to the method of claim 1, where the capability is created by:
receiving a request from the sender to create a capability for the object;
determining existence of a capability for the object for the sender;
creating the capability for the object for the sender if the capability for the object for the sender is determined not to exist.

3. A computer implemented method according to claim 1, wherein determining whether the access rights allow for the capability for the object to be granted for the target comprises determining whether a capability has been granted for the object.

4. A computer implemented method according to claim 1, wherein the capability for the object for the target is a subset of a capability for the object for the sender.

5. A computer implemented method according to claim 1, further comprising determining whether the capability is not a master capability.

6. A computer system including:
processing hardware corresponding to one or more smart contract instances executing on a blockchain system, the processing hardware configured to:
for dynamic capability-based access control granting a capability for an object, where the capability is a secure reference to the object, and where the capability is stored on the blockchain system:
receive a request from a sender to grant a capability for an object for a target, the sender being a first user process that initiates a capabilities operation and the target being a second user process that acquires capabilities according to the capabilities operation;
determine access rights for the sender for the object for the target;
determine whether the access rights allow for the capability for the object to be granted for the target;
store the capability for the object for the target on the blockchain system, wherein the capability is for dynamically determining access control for the object;
determine whether the access rights allow for the capability for the object to be revoked for the target; and
revoke the capability for the object for the target.

7. The computer system of claim 6, wherein the processing hardware is further configured to:
receive a request from the sender to create a capability for the object;
determine existence of a capability for the object for the sender;
create the capability for the object for the sender if the capability for the object for the sender is determined not to exist.

8. The computer system of claim 6, wherein the processing hardware is further configured to determine whether the access rights allow for the capability for the object to be granted for the target by determining whether a capability has been granted for the object.

9. The computer system of claim 6, wherein the capability for the object for the target is a subset of a capability for the object for the sender.

10. The computer system of claim 6, wherein the processing hardware is further configured to determine whether the capability is not a master capability.

11. A product including:
non-transitory machine-readable media; and
instructions stored on the non-transitory machine-readable medium, the instructions configured to, when executed, cause one or more processors corresponding to one or more smart contract instances executing on a blockchain system to:

for dynamic capability-based access control granting a capability for an object, where the capability is a secure reference to the object, and where the capability is stored on the blockchain system:

receive a request from a sender to grant a capability for an object for a target, the sender being a first user process that initiates a capabilities operation and the target being a second user process that acquires capabilities according to the capabilities operation;

determine access rights for the sender for the object for the target;

determine whether the access rights allow for the capability for the object to be granted for the target;

store the capability for the object for the target on the blockchain system, wherein the capability is for dynamically determining access control for the object;

determine whether the access rights allow for the capability for the object to be revoked for the target; and revoke the capability for the object for the target.

12. The product of claim 11, wherein the instructions are further configured to cause the one or more processors to:
receive a request from the sender to create a capability for the object;
determine existence of a capability for the object for the sender;
create the capability for the object for the sender if the capability for the object for the sender is determined not to exist.

13. The product of claim 11, wherein the instructions are further configured to cause the one or more processors to determine whether the access rights allow for the capability for the object to be granted for the target by determining whether a capability has been granted for the object.

14. The product of claim 11, wherein the capability for the object for the target is a subset of a capability for the object for the sender.

15. The product of claim 11, wherein the instructions are further configured to cause the one or more processors to determine whether the capability is not a master capability.

* * * * *